(12) United States Patent
Suzuki (10) Patent No.: US 6,247,104 B1
(45) Date of Patent: Jun. 12, 2001

(54) MEMORY ACCESS CONTROL CIRCUIT (75) Inventor: Kazumasa Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/154,974

(22) Filed: Sep. 17, 1998

(30) Foreign Application Priority Data

Sep. 17, 1997 (JP) ................................................. 10-251216

(51) Int. Cl.[7] .................................................... G06F 12/00
(52) U.S. Cl. ............................................. 711/167; 711/157
(58) Field of Search ................................... 711/167, 157, 711/5

(56) References Cited

U.S. PATENT DOCUMENTS 5,590,299 * 12/1996 Bennett ..................................... 711/5
5,701,434 * 12/1997 Nakagawa ............................. 711/157
5,761,695 * 6/1998 Maeda et al. ............................. 711/5

FOREIGN PATENT DOCUMENTS 6-266616   9/1994 (JP) .
9-134240   5/1997 (JP) .

* cited by examiner

Primary Examiner—Do Hyun Yoo
Assistant Examiner—Nasser Moazzami
(74) Attorney, Agent, or Firm—McGinn & Gibb, PLLC (57) ABSTRACT Disclosed is a memory access control circuit for conducting the interleave control that, between an access request and a data transfer for the access request, another access request and data transfer are inserted while the memory access control circuit is disposed between a memory and a master device to issue an access request to the memory, the memory access control circuit having: means for judging whether an access request can be interleaved or not; and means for selecting whether to conduct the interleave control or not according to the judgement result of the judging means.

8 Claims, 8 Drawing Sheets

MEMORY ACCESS CONTROL CIRCUIT

FIELD OF THE INVENTION

This invention relates to a memory access control circuit, and more particularly to, a memory access control circuit for controlling data transfer between a memory to send data synchronizing with a clock with a frequency higher than conventional frequencies and a master device to issue an access request to the memory.

BACKGROUND OF THE INVENTION

As a main memory to store commands and data, a dynamic random access memory (DRAM) with a large capacity and a low price is used. This memory has a low access speed of about tens of nanoseconds. On the other hand, a master device such as a microprocessor on the memory-access-request-issuing side has an operation speed of tens of MHz, close to 100 MHz, to hundreds of MHz. Thus, the difference between this and the DRAM access speed prevents the enhancement of performance.

To enhance the performance microprocessors are provided with a primary cache memory composed of a static memory in the chip, thereby reducing the number of accesses to DRAM. Also, in DRAM, by giving a row address, one-row of data are first read out by a sense amplifier, and then a target data is read out by giving a column address. However, when the microprocessor is provided with the primary cache memory and the DRAM access is limited to continuous address data within a certain range, the access speed can be enhanced by giving the row address only one time, then changing the column address.

After the memory access is accelerated, the next problem comes to the data transfer rate between the processor and the memory. With the primary cache to allow several data to be, in the lump, written in or read out from the memory, the flowing direction of data is fixed as long as one access is conducted. Using this, the data transfer rate can be enhanced by synchronizing the data transfer with the clock signal. A synchronous DRAM is taken as an example of that.

Further, there is DRAM that is provided with a higher clock frequency and transfer rate (hereinafter referred to as 'high-speed DRAM') by limiting the external bus to a short length and using properly the clock signal according to the transfer direction of data, i.e., reading or writing, to speed up the data transfer.

Meanwhile, Japanese patent application laid-open No. 6-266616 (1994) discloses a technique that, by providing a mechanism for detecting DRAM being read out continuously and a pre-read mechanism for reading data without waiting a request from the microprocessor when the continuous reading is detected, the apparent access time can be reduced.

In the conventional high-speed DRAM, when the master device issues an access request to the memory, the memory side judges whether it is accessible or not. It returns an acknowledge signal when accessible, and returns a non-acknowledge signal when not accessible. After receiving the acknowledge signal, the data transfer is conducted. Thus, the two-stage exchange needs to access data. Therefore, though the data transfer rate is high, it takes a long time until a first access.

To solve this problem, a concurrent high-speed DRAM was developed in which the state of memory is stored in the master device and the exchange of the acknowledge signal is disused, thereby reducing the access time. In accessing the concurrent high-speed DRAM, the master device gives a command composed of an access kind and an address to the high-speed DRAM, measuring a time accessible to the high-speed DRAM in the master device, then conducting the data transfer. Between the command and the data transfer, there exists a time period before the high-speed DRAM is allowed to access. During this time period, a bus connecting between the memory and the master device is not used.

So, an interleave mode which is used to transfer the next access command or previous access data while using this time period is provided. However, the interleave transfer cannot be used when multiple accesses do not exist, and the access time, on the contrary, becomes longer when using the interleave mode to conduct one access only. This is because the interleave transfer always provides a time period to include the command and data of another access between the command and data of one access.

On the other hand, when a data size transferable with one access is increased, the number of commands can be reduced, thereby enhancing the performance of data transfer. However, when using the interleave transfer, multiple accesses need to be stored in the memory control circuit. Therefore, if a register enabled to retain data even to a maximum-capacity access is provided, the hardware size must be increased.

Also, there is another problem that the clock frequency of interface is different from the clock frequency of the master device. This is because, though interface part of the high-speed DRAM is standardized to have a fixed frequency, the master device has a frequency defined by a required processing performance or internal circuit composition or it has another standardized interface circuit, therefore being unable to match with the fixed frequency of a certain interface.

Furthermore, an interrupt time to memory needs to be a constant period, whereas a frequency on the side of master device may be varied with a processing amount executed and may be varied because its maximum operating frequency varies due to the dispersion of transistor performance when manufactured. This is because the memory is DRAM which needs refreshing that a refresh request is generated by an interrupt, and therefore the refreshing period is determined by the DRAM side.

SUMMARY OF THE INVENTION

Accordingly, it is an object of the invention to provide a memory access control circuit that the interleave control can be efficiently conducted according to the number of access requests.

It is a further object of the invention to provide a memory access control circuit that the size of hardware can be prevented from being enlarged even when the amount of transfer data is much.

It is a further object of the invention to provide a memory access control circuit that can be adapted when a transfer clock signal frequency of memory and an operation clock frequency of master device are different from each other.

It is a further object of the invention to provide a memory access control circuit that an interrupt signal can be generated with a constant interval even when the operation clock frequency of master device is changed after manufacturing the circuit.

It is a further object of the invention to provide a memory access control circuit that a memory can be accessed by several master devices.

According to the invention, a memory access control circuit for conducting the interleave control that, between an access request and a data transfer for the access request, another access request and data transfer are inserted while the memory access control circuit is disposed between a memory and a master device to issue an access request to the memory, comprises:

means for judging whether an access request can be interleaved or not; and means for selecting whether to conduct the interleave control or not according to the judgement result of the judging means.

According to another aspect of the invention, the memory access control circuit further comprises:

means for dividing the access request into a plurality of access requests while corresponding data of the original access request to the plurality of access requests.

According to another aspect of the invention, the memory access control circuit further comprises:

a frequency-difference buffering means for allowing the writing to the memory to synchronize with a first clock frequency with which the master device is operated and allowing the reading from the memory to synchronize with a second clock frequency with which a data transfer of the memory is synchronized, wherein the first and second frequencies are different from each other.

According to another aspect of the invention, the memory access control circuit further comprises:

means for generating an interrupt to refresh the memory; and a timer means for providing interrupt timing with a constant time period for the interrupt generating means;

wherein the timer means is driven by a clock for synchronizing the data transfer of the memory or a clock frequency-divided from that clock.

According to another aspect of the invention, the memory access control circuit further comprises:

a plurality of master devices, and the plurality of master devices and the memory access control circuit are connected through a bus control means to a common bus.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
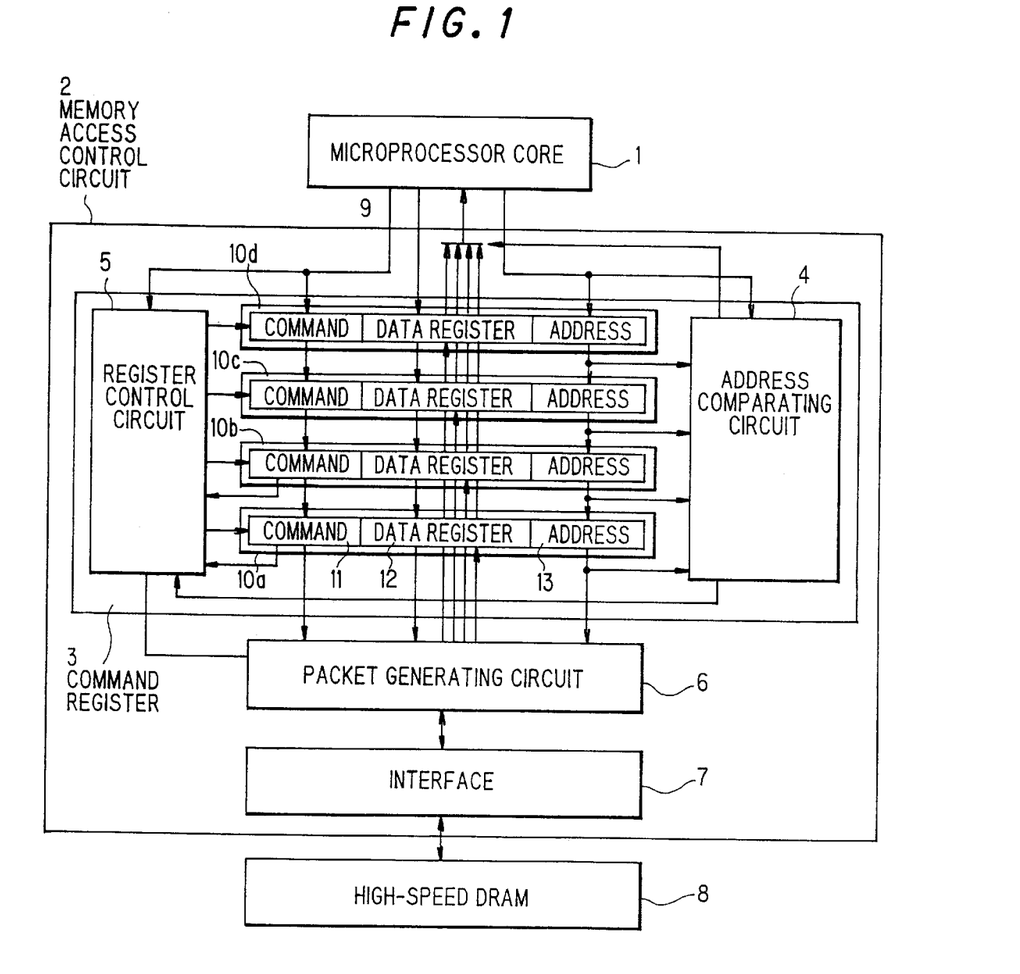
FIG. 1 is a block diagram showing a memory access control circuit in a first preferred embodiment according to the invention.

A memory access control circuit in the first preferred embodiment according to the invention will be explained in FIG. 1.

A microprocessor core 1 is supposed as a master device. This part may be another device to issue a memory access request, other than the microprocessor core. Between the master device 1 and a high-speed DRAM device 8, a memory access control circuit 2 to generate a control protocol for the high-speed DRAM device 8 is provided.

The memory access control circuit 2 comprises a command register 3 which retains an access request from the master device 1, a packet generating circuit 6 which generates the timing of transferring a command and data to the high-speed DRAM device 8 and conducts the exchanging of the transfer order of a command and data in an access when operated in the interleave mode, and an interface 7 which transmits and receives a signal synchronizing with a high-speed frequency used to access the high-speed DRAM device 8 and converts it into a signal with a frequency easy to handle in LSI.

Further, the command register 3 includes command register entries 10a, 10b, 10c and 10d to retain a access request from the master device 1. In FIG. 1, the four entries are shown. At least two command register entries are necessary because the efficiency is reduced unless at least two access requests are data-transferred in the interleave mode.

Each of the command register entries 10a to 10d is composed of a command storing register 11 to retain the kind of access request to the high-speed DRAM device 8, a data storing register 12 to retain the data of the access request, and an address storing register 13 to retain a memory address to be accessed.

A register control circuit 5 registers an access request sent from the master device 1 into the command register entries 10a to 10d and controls the transfer of the registered access request to the packet generating circuit 6.

An address comparing circuit 4 compares an address of the memory 8 to be retained in each of the command register entries 10a to 10d with an address of the memory 8 from master device 1, when data to be read out from the high-speed DRAM device 8 and retained in the command register entries 10a to 10d is sent to the master device 1. When the addresses are identical, the data of the entry is selected by a selector 9, returned to the microprocessor core 1.

Figure 2:
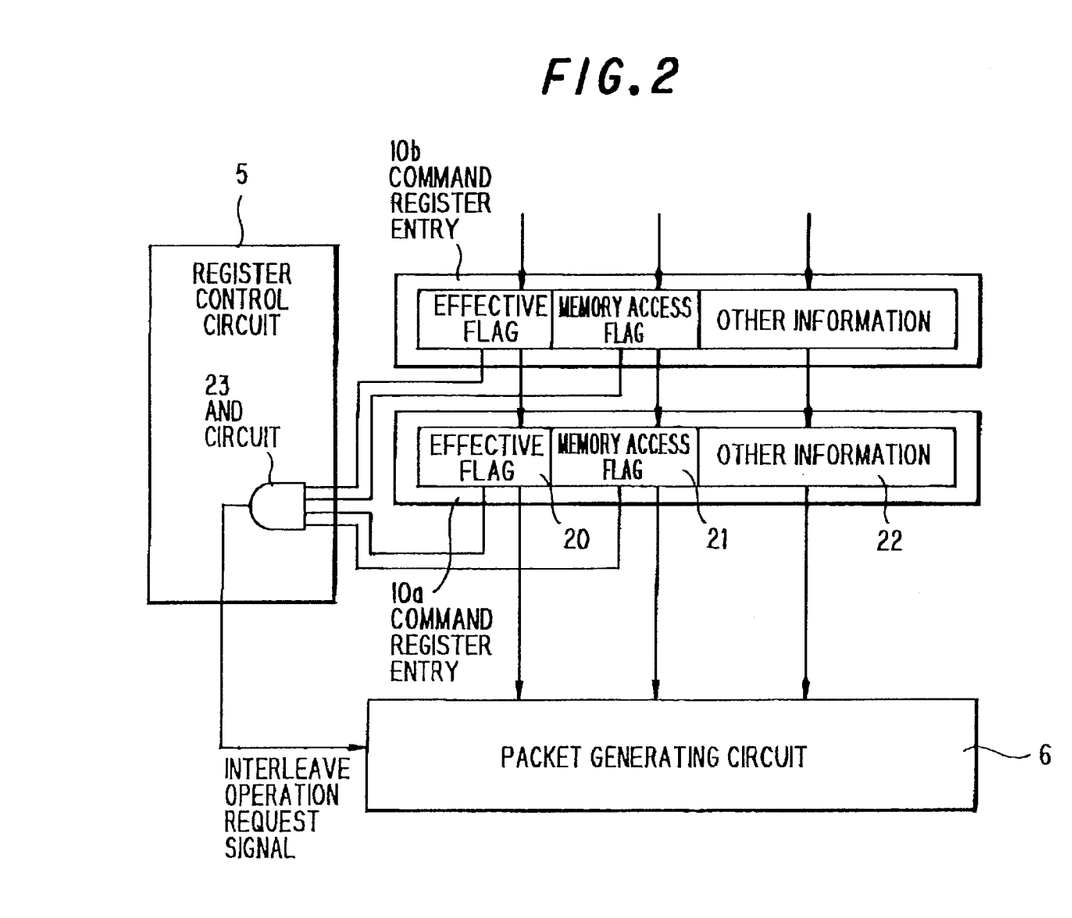
FIG. 2 is a block diagram showing command register entries in FIG. 1.

FIG. 2 shows a composition of the command register entries. Meanwhile, like parts are indicated by like reference numerals as used in FIG. 1 and their explanations are omitted.

In FIG. 2, the command register entry 10a retaining an access to be issued next time and the command register entry 10b retaining an access to be issued the next time are shown. Though the command register entries 10c and 10d also exist in the memory access control circuit 2, they are not shown because they do not relate to the detection of interleave issuing.

In each of the command register entries 10a to 10d, there is an effective flag 20 to indicate whether an access request is retained inside the entry or not and a memory access flag 21 to indicate that the kind of access is a memory access, in the command storing register 11.

Other information storing register 22 is part that does not relate to the interleave. The rest of the command storing register, the address storing register 13 and the data storing register 12 are included in that. Conditions enabling a transfer by the interleave are that two or more access requests can be issued hereafter and that both the two accesses are a memory access.

So, these conditions can be detected by conducting the AND operation of the respective effective flags and memory access flags of the two command register entries by a four-input AND circuit 23 of the register control circuit 5. This signal can be input, as an interleave request signal, to the packet generating circuit 6.

Meanwhile, as an access other than the memory access, there may exist an access to a register in the high-speed DRAM device 8. This access is not an object of the interleave.

Figure 3A:
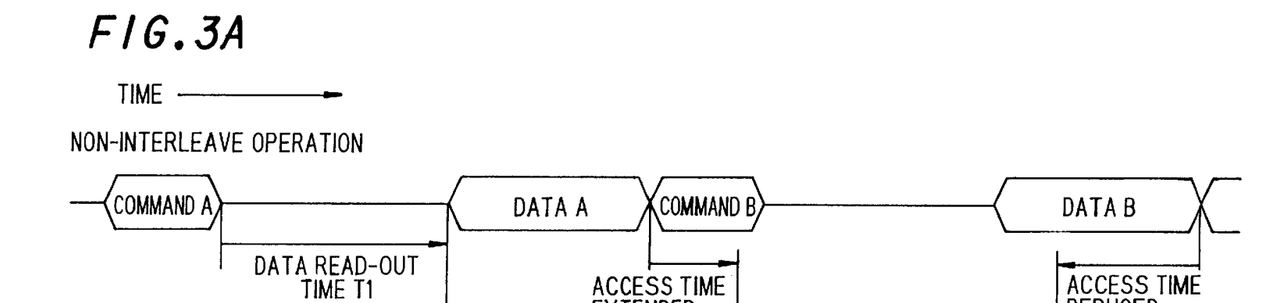
FIG. 3 is a timing chart showing the issue timing of a command and data.
Figure 3B:
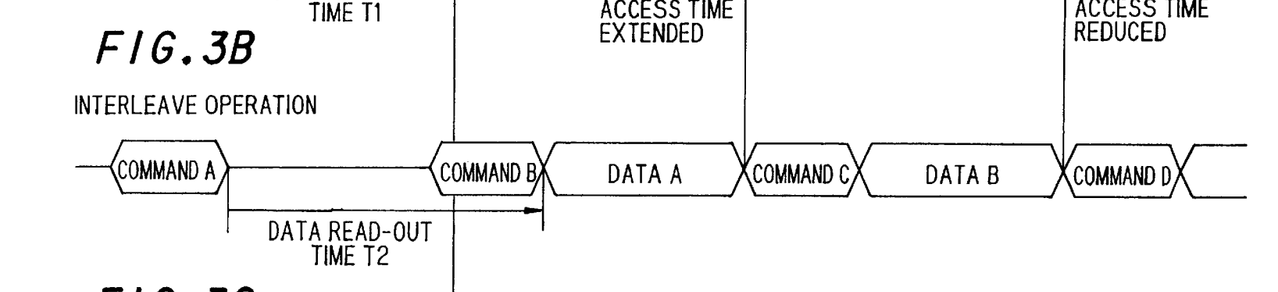
Figure 3C:
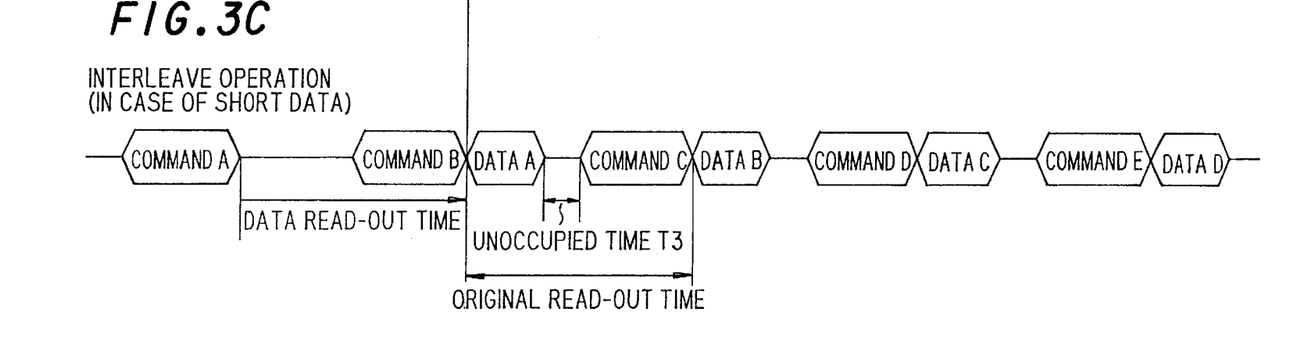

Next, referring to FIGS. 3A to 3C, the interleave operation will be explained. FIGS. 3A to 3C are timing charts showing timings when commands and data are issued.

FIGS. 3A to 3C show the time-series states of commands and data to be transferred on the bus. FIG. 3A shows transfer states in non-interleave operation. At first, a command A is transferred. In this command A, the kind of access and an address to be accessed are included. Supposing the reading from the memory, when the high-speed DRAM device receives the command A, it judges whether the target data is read out in the internal sense amplifier. When it is not read out, current data in the sense amplifier is written back to the original memory column and then a memory column where the target data exists is read out. When the target data is provided in the sense amplifier, the data is sent out. Time until the sending out is time indicated as 'data read-out time T1' in FIG. 3A.

In the non-interleave operation, after the transfer of data A corresponding to the command A is completed, a command B for the next access is issued. The transfer of data B is similarly conducted after waiting until the target data is provided in the sense amplifier of the high-speed DRAM device. Therefore, there may exist time when no data is transferred, at a rather high rate.

FIG. 3B shows transfer states in the interleave operation. After issuing the command A and before conducting the transfer of data A, the command B for the next access is issued. Just after issuing the command B, the transfer of data A is conducted. After completing the transfer of data A, a command C for the next access of the command B is transferred, followed by the transfer of data B.

Namely, between the transfer of the command B and the transfer of data B, the transfer of previous data A and the transfer of the command C for the next access are conducted. In this period, data for the command B is provided in the sense amplifier of the high-speed DRAM device. Thus, the non-data-transferred time can be highly reduced, and the bus connecting between the high-speed DRAM device and the memory access control circuit can be thereby used efficiently.

In the period, between the command A and the command B, when data for the other access can be transferred, no data is transferred when the command A is the first access. However, it is required to reserve such time that data can be transferred. Due to this, data read-out time T2 between the command A and data A becomes longer than T1 in the non-interleave transfer. Therefore, when the interleave mode is used for only one access request, the access time becomes longer. On the other hand, in case of two access requests, the access time is shortened, as understood from the comparison between the transfer completion times for data B. When the interleave access is ended up by two accesses, nothing is transferred in the place of the command C in FIG. 3B. When three or more access requests continue, the access time is further shortened.

A memory access control circuit in the second preferred embodiment according to the invention will be explained in FIG. 4. Meanwhile, like parts are indicated by like reference numerals as used in FIG. 1 and their explanations are omitted.

Figure 4:
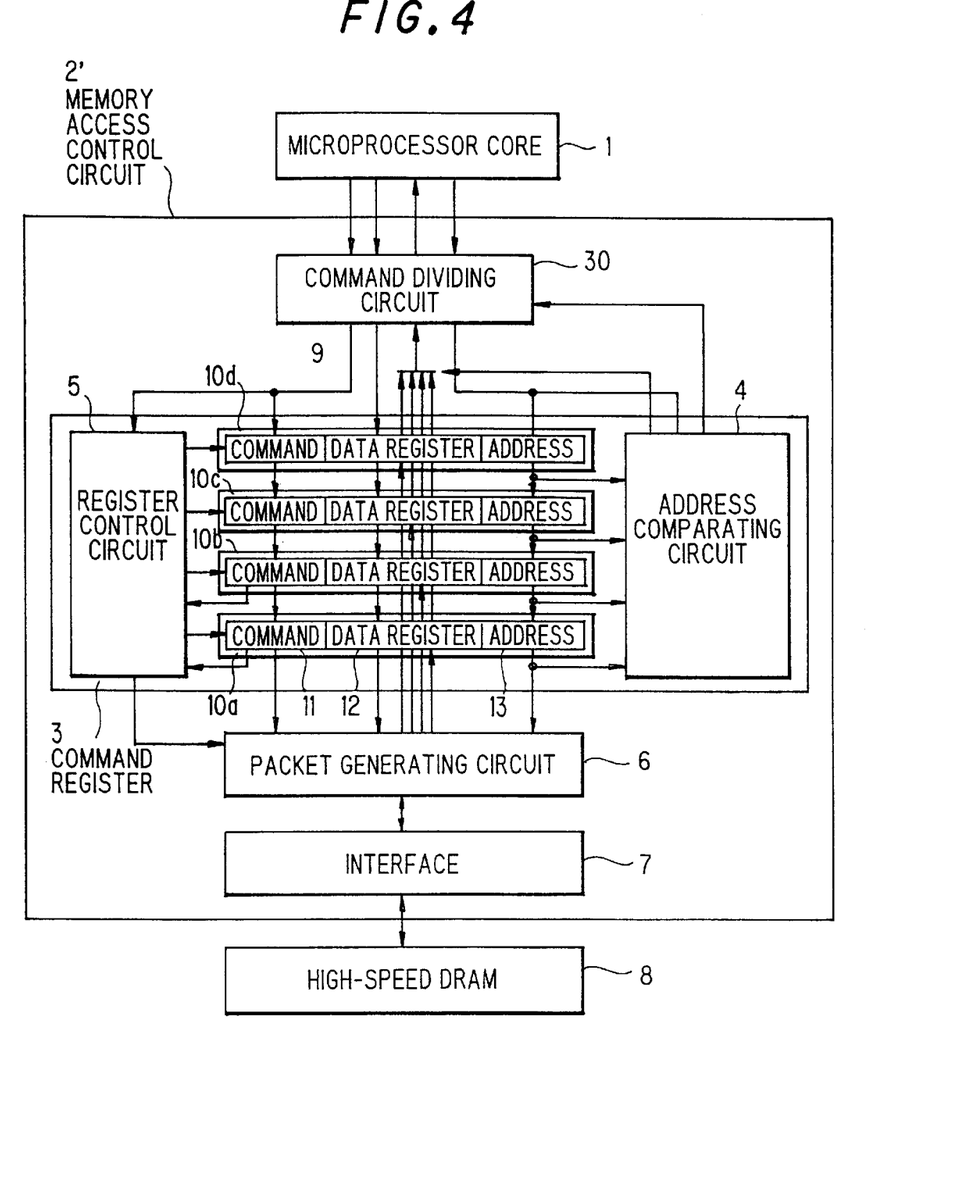
FIG. 4 is a block diagram showing a memory access control circuit in a second preferred embodiment according to the invention.

FIG. 4 shows an example that the utilization efficiency of bus is enhanced by increasing the number of access requests to raise the probability of data transfer by interleave. The master device is a microprocessor core 1. The composition that the memory access control 2 lies between the master device 1 and the high-speed DRAM device 8 is identical with that in FIG. 1. In this embodiment, the memory access control circuit is indicated by 2'. The composition and operation of the command register 3, packet generating circuit 6 and interface 7 in the memory access control circuit 2' is identical with that in FIG. 1. A command dividing circuit 30 is newly added between the microprocessor core 1 and the command register 3.

An access request issued by the master device such as the microprocessor core 1 has various data sizes from short one, 1 byte, to long one, hundreds of bytes. When the length of entry is thus variable, it is necessary to provide a data storing region having a capacity corresponding to a access with the maximum data length, in the command register entry 10.

However, when the interleave transfer is conducted, at least two command register entries need to be provided. Therefore, the register number of data storing register is so increased, thereby increasing the amount of hardware. Further, while such large data is transferred from the microprocessor core 1 to the memory access control circuit 2', the next access cannot be register. Therefore, the probability that the number of entries registered in the command register entry 10 is two or more is reduced. Thus, the transfer efficiency of the bus connecting between the high-speed DRAM device 8 and the memory access control circuit 2' is reduced.

So, the command dividing circuit 30 divides an entry request sent from the microprocessor core 1 into several access requests, each of which has a size acceptable in the data storing region of one command register entry 10, then issuing them. Owing to this, when a large data transfer request is sent, several entries are registered in the command register 11 and the interleave transfer is conducted.

When the size of the data storing register 12 is too small, the transfer time of a command and data to be transferred between the command transfer and the data transfer for one entry in the interleave mode becomes shorter than the data read-out time in the non-interleave mode shown in FIG. 3A. Therefore, unoccupied time when nothing is transferred occurs, thereby reducing the transfer efficiency. This unoccupied time T3 is shown in FIG. 3C.

Also, when the size of the data storing register 12 is too large, the amount of hardware is increased. Most of access requests are ones for replace or refill of one line in primary cache, and therefore it is not necessary to provide a data storing register with a size greater than that of one line in primary cache. Accordingly, the suitable size is around 32 bytes or 64 bytes per one entry.

The command dividing circuit 30 may be provided with a counter that increases an address in a data storing register 12 of one command register entry 10 by using an address in access request as an initial value, as a mechanism for producing a head address to enter the next entry.

The kind of command does not need to process internally because it is the same as that of the original entry request. Also, as to data, there is provided a mechanism for switching the storing part to store data sequentially into several entries.

In the operation of a microprocessor, when data is written in a memory, it can proceed to the next processing even in the state that a register value on the halfway of a path to write in the memory is retained. On the other hand, when data is read out from a memory, the next processing cannot be begun until the data necessary for the processing is taken out from the memory. Namely, the efficiency of processing in the memory access can be enhanced by conducting preferentially the reading rather than the writing.

In the memory access control circuits 2, 2' of the invention, several access requests are retained internally. Of the several access requests retained, one concerning the reading from memory can be issued prior to the writing, thereby enhancing the processing performance of the entire system.

Also, when a read-out request to a same address as that of a previous write access request is sent, data in the command register entry 10 can be read out and returned to the master device 1, without waiting an access to the high-speed DRAM device 8. However, this is limited to the case of memory access. In case of an access to a register in the high-speed DRAM device 8, the access to the high-speed DRAM device 8 has to be always conducted, even when it is for a same address, because the internal state may be varied.

The command dividing circuit 30 serves to divide one access request into several access request with a size acceptable in one command register entry when it is conducted to access a large data by the one access request. However, when an access request from the microprocessor core 1 relates to the reading of a program, a program following this can be issued before an access request is issued from the microprocessor core 1, and the data can be retained in the memory access control circuit 2'.

In most cases, a program is stored in continuous addresses and sequentially executed. Further, its processing must stop completely when no command to be executed exists in the microprocessor core 1. Thus, to pre-read a next address to reduce the penalty in the case that the command cache mistakes can serve to enhance the system performance. This function can be performed by setting the capacity of the data storing register 12 in the command register entry 10 to be equal to one line of cache, producing a data address to be stored in a next command register entry 10 by using the counter used for the command division, storing the access request in the next command register entry 10. To assign data to several entries is not necessary because it is a reading from the memory.

A memory access control circuit in the third preferred embodiment according to the invention will be explained in FIG. 5. Meanwhile, like parts are indicated by like reference numerals as used in FIG. 4 and their explanation are omitted.

Figure 5:
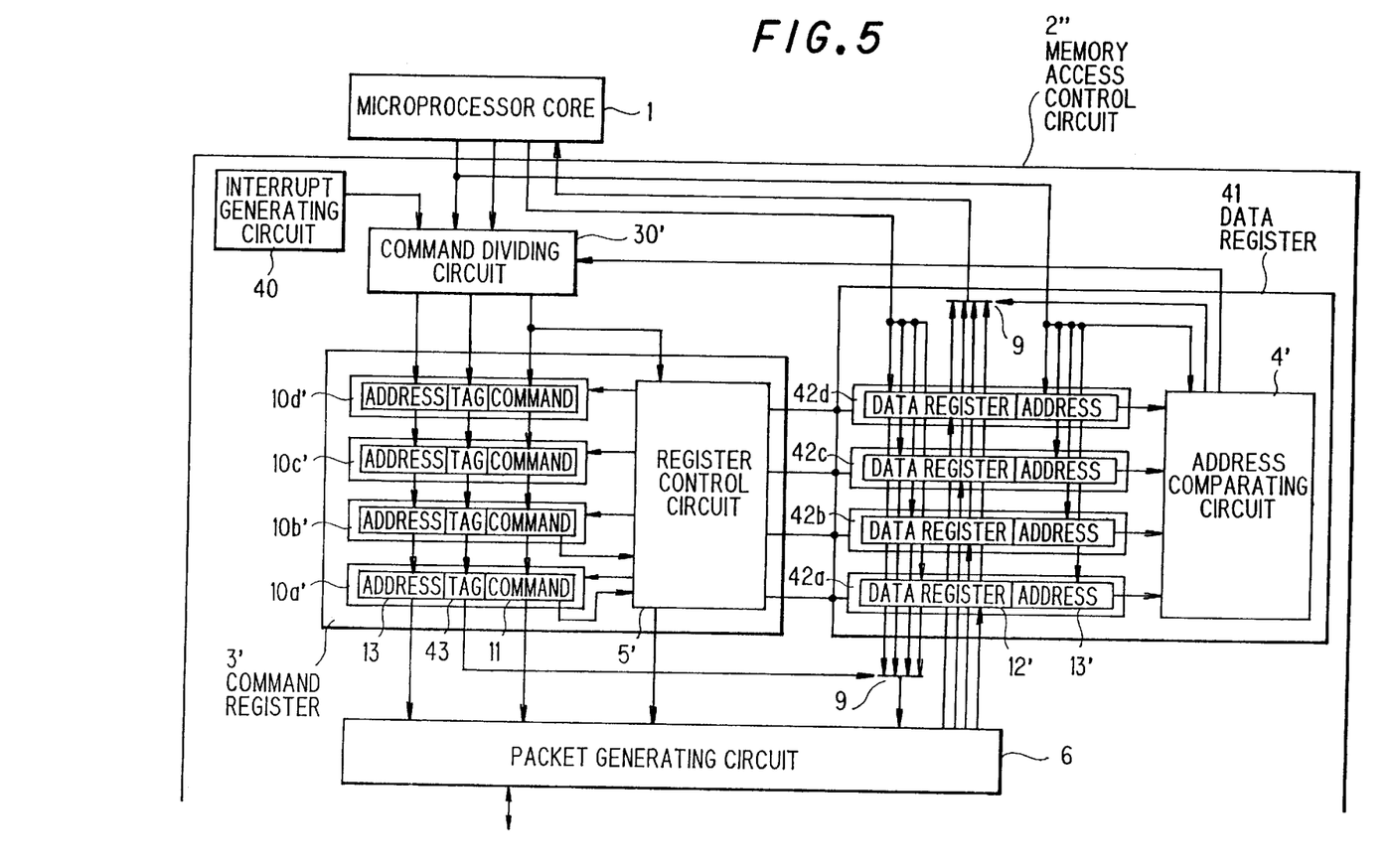
FIG. 5 is a block diagram showing a memory access control circuit in a third preferred embodiment according to the invention.

In FIG. 5, the data storing register 12 is separated from the command register entry 10. The path from the packet generating circuit 6 to the high-speed DRAM device 8 is the same as that in FIG. 1. Therefore, the interface 7 and the high-speed DRAM device 8 are omitted in FIG. 5.

Of an access request, a command is issued previously and thereafter becomes useless, but data needs to be retained until being returned to the master device 1. To separately manage a command and data allows the circuit to be composed easier because the retention time is different between the command and data.

A command dividing circuit 30' has a composition similar to that in FIG. 4, but data from the microprocessor core 1 is stored directly into a data register 12'. A data register entry to store is determined by a register control circuit 5'. A vacant entry 12' is selected as an entry 12' to store.

For command register entries 10a', 10b', 10c' and 10d' in a command register 3', adding to the address storing register 13 and the command storing register 11, a tag 43 indicating which data register entry is storing data in the writing of memory or is to store data in the reading of memory is provided. The data storing register 12' is removed from the command register entries 10a' to 10d'. The mechanism for detecting the interleave transfer is the same as that in FIG. 2 and is incorporated in the register control circuit 5'.

Data register entries 42a, 42b, 42c and 42d are composed of data storing registers 12' and address storing registers 13'. When the content of the address storing register 13' coincides with the address of a reading access request from the master device 1, the content of the data register 12' is returned to the master device 1. The comparison of address is conducted by an address comparing circuit 4', and the selector 9 selects and returns it.

The number of data register entries 42a to 42d needs, at least, to be the same as the number of command register entries 10a' to 10d'. The number of the data entries may be more than that of the command entries because the time when being registered in the data register entries 42a to 42d is longer than the time when being registered in the command register entries 10a' to 10d'. Also, In FIG. 5, an interrupt generating circuit 40 is additionally provided in the memory access control circuit. This does not relate to the separation of the command register and the data register.

The interrupt generating circuit 40 generates a interrupt to refresh DRAM and produces an access request to refresh. In case of the high-speed DRAM 8, a signal voltage of the bus between the memory and the interface is regulated. A similar interrupt circuit needs to be added because a current control request also needs to be conducted periodically. These interrupt request signals are applied to the command dividing circuits 30, 30', generating a new access every time the interrupt generates, being registered into the command register entry 10. When several requests occur simultaneously, any one is preferentially issued sequentially. The preference order may be determined by a method suitable for the system.

Even when the data register 12 is provided separately from the command register 11, a command can be divided in the case that the amount of data to be accessed by one access request is large. Of course, without dividing the access, each entry may be provided with such a capacity that even an access request with the maximum data can be stored in one entry.

Also, when the maximum-data access request is not frequent, it may be taken that all the data register entries 10 do not have a same capacity and only one entry have a capacity enabling to store the data of the maximum-data access request.

Even when the data register 12 is separated from the command register 11, a memory-reading access can be issued in preference to a memory-writing access. In this case, the order of the issuing of command has only to be changed in the command register entry 10, and the data register entry 42 has only to retain data as it is because the tag to indicate the data register entry 42 is retained in the command register 11.

The capacity of the data storing register 12 is large, and the capacity of the address storing register 13, command storing register 11 and tag 42 is small, compared with that of the data storing register 12. Therefore, the exchanging of command can be made easier than the composition in FIG. 1 or 4, and the amount of hardware is not so increased.

Similarly, even when the data register 12 is separate from the command register 11, in reading a program from the high-speed DRAM device 8, an access request for a following program can be issued without waiting an access request from the master device 1. Even when the access request for the following program does not come immediately, the access request can be registered using another data register entry 42 when the data register 12 is separated. Also, when the pre-reading mistakes and the reading of a program for another address occurs, the data register entry 42 used for the pre-reading is released.

A memory access control circuit in the fourth preferred embodiment according to the invention will be explained in FIG. 6. Meanwhile, like parts are indicated by like reference numerals as used in FIG. 5 and their explanations are omitted.

Whereas the clock frequency to operate the high-speed DRAM device 8 and the interface 7 is determined by a standard, the operation clock frequency of the master device is determined by a processing amount aimed, the composition of hardware, the operating speed of another interface circuit etc. Thus, in most cases, both are different.

Further, the operation frequency may be determined after the manufacturing because the transistor characteristics in the manufacturing can be varied.

So, a frequency conversion buffer 50 is disposed between a command dividing circuit 30' and a command register 30', enabling operating at different frequencies. The frequency conversion buffer 50 is a circuit that conducts the writing while synchronizing with the clock frequency of the master device 1 and conducts the reading while synchronizing with the operation frequency of a protocol generating circuit 6.

A flag to indicate the writing is provided internally, and this flag is put up when data is written. The reading side monitors this flag, starting the reading when the data writing is detected, dropping the flag after the reading. The writing side conducts the next writing after looking at this flag dropping. First and second clocks are input to the data register, enabling it to conduct the writing or reading by any one of the clock frequencies. The ending of the writing and reading is conducted by the flag, like the frequency conversion buffer 50. It has only to provide a flag for each data register entry 42.

On the other hand, a timer in the interrupt generating circuit to issue a refresh request is composed of a counter etc. and it needs to generate one interrupt in a certain period, regardless of the clock frequency of the master device 1. The interrupt generated is input to the command dividing circuit 30', and therefore the interrupt generating circuit 40' is operated with a clock on the master side.

However, a timer 51 to generate a certain interval is disposed on the side of the interface 7 and a frequency conversion buffer 50' gives a trigger to the interrupt generating circuit. The clock frequency on the side of the interface 7 is a value determined by the standard, and therefore a certain interval can be measured even by using the same counter.

Meanwhile, as the clock frequency to drive the counter circuit, a frequency divided from the clock frequency on the side of the interface may be used.

Figure 6:
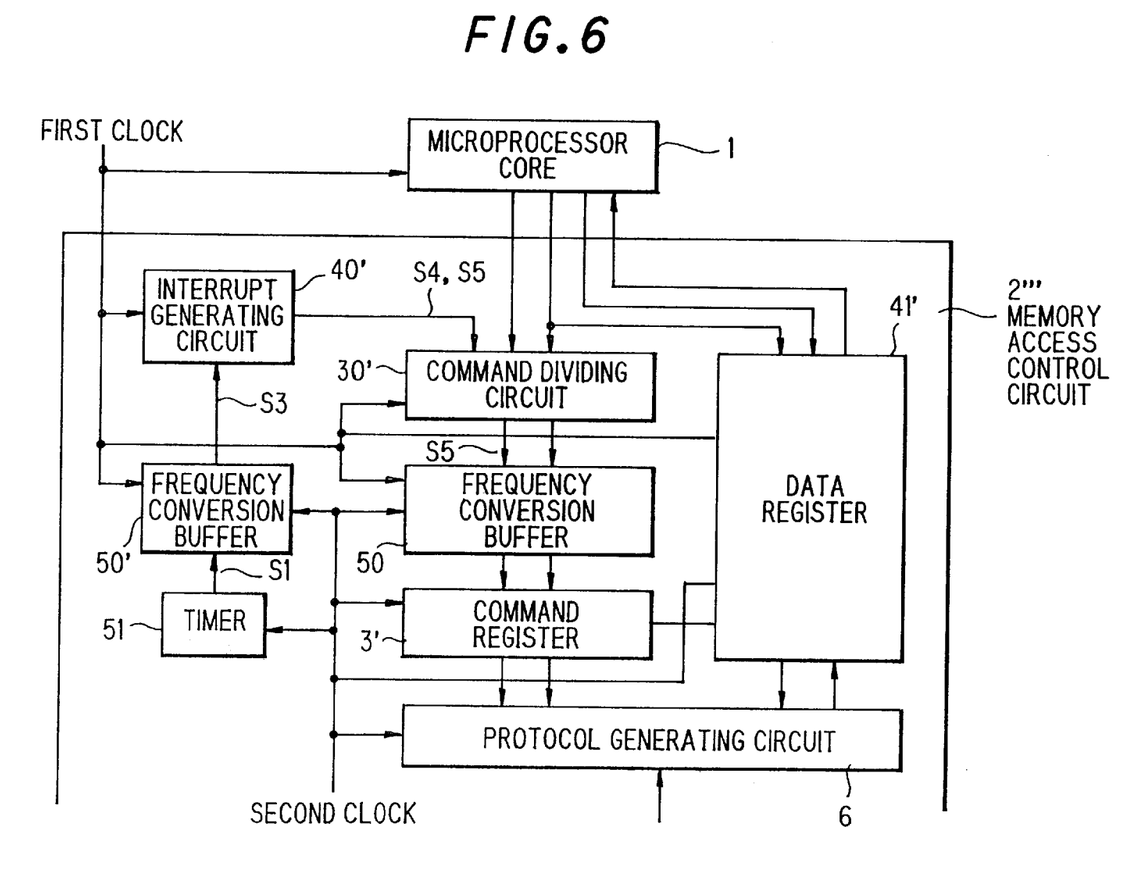
FIG. 6 is a block diagram showing a memory access control circuit in a fourth preferred embodiment according to the invention.
Figure 7:
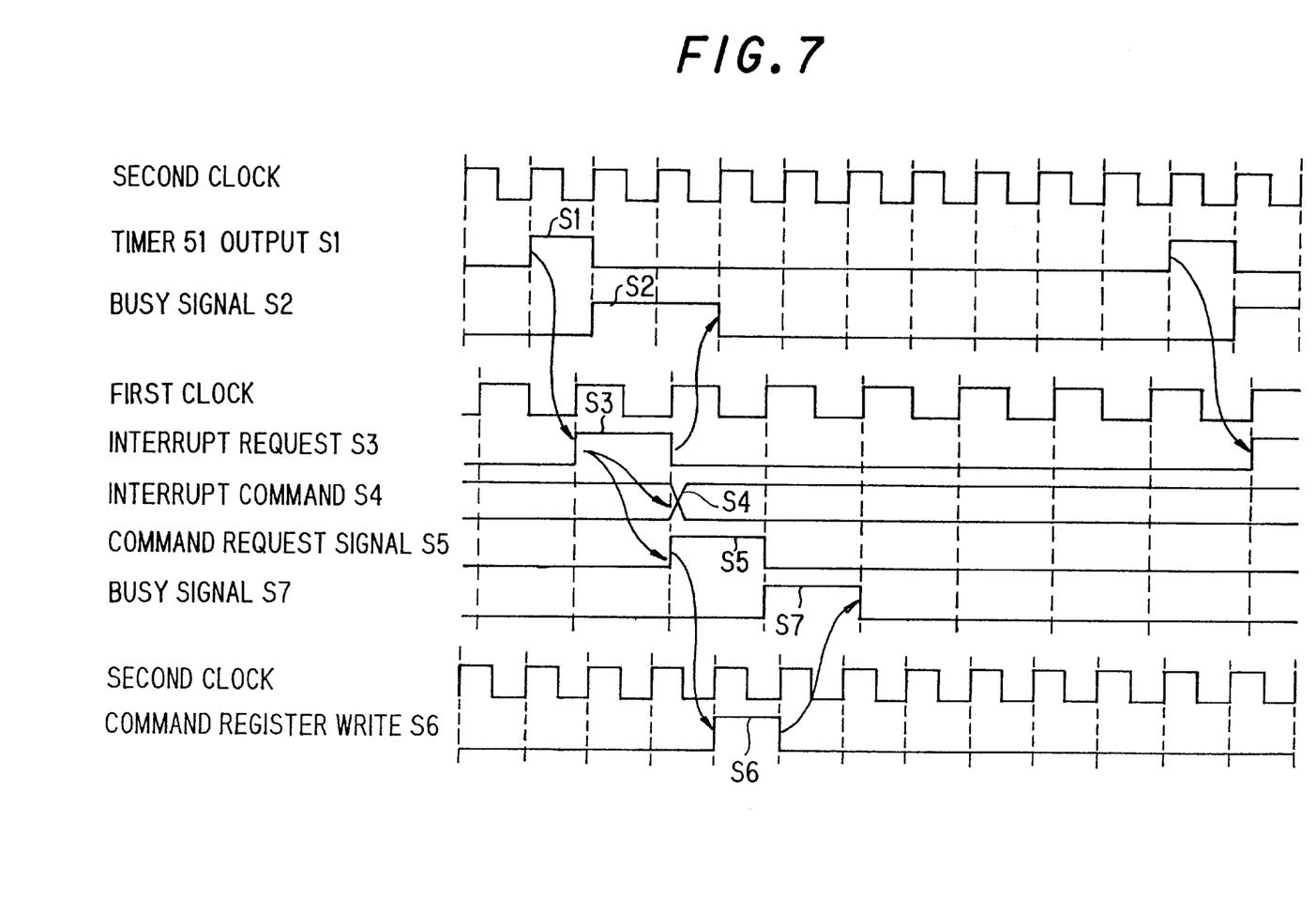
FIG. 7 is a timing chart showing the operation of an interrupt generating circuit 40' in FIG. 6.

Next, referring to FIGS. 6 and 7, the operation of the interrupt generating circuit 40' will be detailed. FIG. 7 is a timing chart showing the details of operation in the interrupt generating circuit.

The side of the high-speed DRAM device 8 operates synchronizing with the second clock. Also, the side of the microprocessor core 1 operates synchronizing with the first clock. The frequency of the second clock is higher than that of the first clock in FIG. 7. However, even if the frequency of the first clock is higher, the operations of the frequency conversion buffers 50, 50' are only reversed.

The timer 51 operates with the second clock and outputs a pulse S1 with one-clock width in a certain period. This pulse S1 is received by the frequency conversion buffer 50'. A busy signal S2 rises in the frequency conversion buffer 50'. When the first clock rises when the input pulse S1 is "1" or the busy signal S2 is "1", the frequency conversion buffer 50' outputs a pulse (interrupt request) S3 with the one-clock width of the first clock.

Then, when the output pulse S3 of the frequency conversion buffer 50' is input to the interrupt generating circuit 40', the interrupt generating circuit 40' outputs an interrupt command S4 and a command request signal S5, with the next rising of the first clock.

When the frequency conversion buffer 50 receives this command request signal S5, a command register write signal S6 rises with the rising of the second clock following the rising of the command request signal S5. This signal S6 has a pulse with the one-clock width of the second clock.

Then, when the command register write signal S6 does not fall until the next rising of the first clock, a busy signal S7 is set.

If the command register write signal S6 falls, the busy signal S7 is not set.

Then, the interrupt command S4 is written into the command register 3', with the command register write signal S6. The interrupt command S4 comes out prior to the command register write signal S6 because it is output with the command request signal S5. Thereby, a sufficient setup time can be obtained. Therefore, it does not necessarily need to be frequency-converted.

Thus, the clock signal on the side of the master 1 is given to the command dividing circuit 30', frequency conversion buffer 50', data register 41' and interrupt generating circuit 40', and the clock signal on the side of the interface 7 is given to the frequency conversion buffers 50, 50', command register 3', data register 41', timer 51, protocol generating circuit 6 and interface 7 (not shown in FIG. 6).

The reason why the command dividing circuit 30' is disposed on the side of the master device 1 is that arbitration in the case that several access requests simultaneously occur from the master device 1 and the interrupt generating circuit 40' needs to be conducted in a short time, due to the high clock frequency on the side of the master device 1. If the operation frequency on the side of the master circuit 1 is low, the frequency conversion buffer 50 may be disposed before the command dividing circuit 30' and the arbitration may be conducted on the side of the interface 7. In this case, the interrupt generating circuit 40' will be also operated with the clock signal on the side of the interface 7, and therefore the frequency conversion buffer 50' becomes unnecessary.

When the command register and the data register are not separated, the frequency conversion buffer 50 is disposed between the command dividing circuit 30 and the command register 3 in FIG. 4. As to a command and an address, a signal has only to be sent in the direction of from the side of the master 1 to command register 3. As to data, two pairs are necessary to provide because it needs to be transferred bilaterally.

Figure 8:
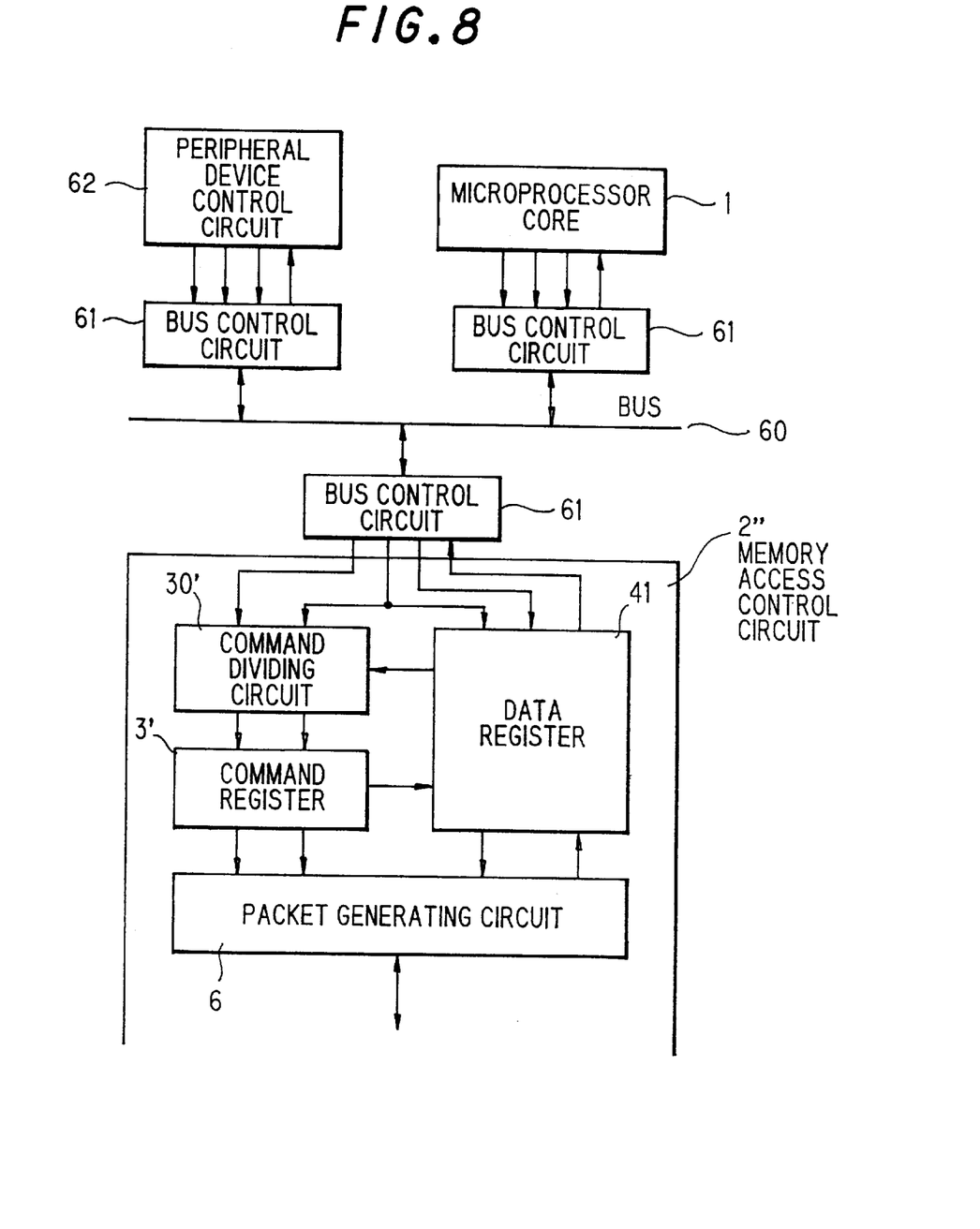
FIG. 8 is a block diagram showing a memory access control circuit in a fourth preferred embodiment according to the invention.

A memory access control circuit in the fifth preferred embodiment according to the invention will be explained in FIG. 8. Meanwhile, like parts are indicated by like reference numerals as used in FIG. 6 and their explanations are omitted.

With the compositions described above, one microprocessor core 1 is supposed as the master device. The number of the master device is not limited to one and is frequency several. For example, such cases are that several microprocessors are mounted on one-chip LSI, DMA (direct memory access) circuit is mounted, and memory-accessing is directly conducted from another external bus.

In particular, in case of a high-speed DRAM, a device connecting with the bus except the high-speed DRAM is limited to one interface. Therefore, in a system composed of several LSIs, accessing the high-speed DRAM from LSI with no interface is, in some cases, conducted by directly accessing the high-speed DRAM through the external bus.

So, several master devices are connected to a bus 60. In FIG. 8, a microprocessor core 1 and a peripheral device control circuit 62 correspond to the master devices. Each of the master devices is connected through a bus control circuit 61 to the bus. Similarly, a memory access control circuit 2" is also connected through a bus control circuit 61 to the bus. An access request to the high-speed DRAM is sent from the several master devices through the bus. Meanwhile, the composition of the memory access control circuit itself is the same as that in case of one master device.

Effects in the case that the circuit of the invention is operated in the interleave operation will be described below, supposing that a 256-byte read-out request is issued to the high-speed DRAM and it is issued dividing into 64-byte four read-out requests in the memory access control circuit.

Beginning from the state that the command register entries are vacant, a first access request is registered and then issued immediately. At this time, only one entry is filled and therefore the interleave cannot be issued. However, in other three entries, the command register entries are registered while the first command is issued. Therefore, the interleave operation is enabled.

In case of non-interleave operation, when reading out by 64 bytes, a next command issue is conducted at the $15^{th}$ clock from the command issue and the reading of the final data is conducted at the $18^{th}$ clock from the command issue.

Thus, in the non-interleave, it takes 63 clocks to complete all accesses. In case of the interleave, the next command can be issued at the $9^{th}$ clock and the data is returned at the $21^{st}$ clock. Namely, the reading is completed with 54 clocks. Thus, 9 clocks can be reduced.

Also, by reason that the amount of data per an access request is limited, the capacity of each data register entry can be reduced, thereby reducing the amount of hardware.

Also, even when the interface and the master circuit operate with different frequencies, the memory access control circuit can be operated with several clocks. Further, even when the clock frequency of the master device is varied, the interrupt interval such as refreshing can be made constant in the same circuit composition.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A memory access control circuit for conducting an interleave control that, between an access request and a data transfer for the access request, another access request and data transfer are inserted while said memory access control circuit is disposed between a memory and a master device to issue an access request to the memory, comprising:

means for judging whether the access request can be interleaved or not;

means for selecting whether to conduct the interleave control or not according to the judgement result of said judging means;

means for dividing said access request into a plurality of access requests while extracting data corresponding to said plurality of access requests; and frequency-difference buffering means for allowing the writing to the memory to synchronize with a first clock frequency with which said master device is operated and allowing the reading from the memory to synchronize with a second clock frequency with which a data transfer of the memory is synchronized, wherein said judging means judges said interleave control to be enabled when at least two access requests exist and are a write or read request to the memory, and wherein said first and second frequencies are different from each other.

2. A memory access control circuit for conducting an interleave control that, between an access request and a data transfer for the access request, another access request and data transfer are inserted while said memory access control circuit is disposed between a memory and a master device to issue an access request to the memory, comprising:

means for judging whether the access request can be interleaved or not;

means for selecting whether to conduct the interleave control or not according to the judgement result of said judging means;

request preference means for issuing a read request to the memory prior to a write request to the memory; and frequency-difference buffering means for allowing the writing to the memory to synchronize with a first clock frequency with which said master device is operated and allowing the reading from the memory to synchronize with a second clock frequency with which a data transfer of the memory is synchronized, wherein said judging means judges said interleaved control to be enabled when at least two access requests exist and are a write or read request to the memory, and wherein said first and second frequencies are different from each other.

3. A memory access control circuit for conducting an interleave control that, between an access request and a data transfer for the access request, another access request and data transfer are inserted while said memory access control circuit is disposed between a memory and a master device to issue an access request to the memory, comprising:

means for judging whether the access request can be interleaved or not;

means for selecting whether to conduct the interleave control or not according to the judgement result of said judging means;

pre-read means for issuing an access request for reading a following program prior to the access request from said master device when said access request is for reading a program stored in the memory; and frequency-difference buffering means for allowing the writing to the memory to synchronize with a first clock frequency with which said master device is operated and allowing the reading from the memory to synchronize with a second clock frequency with which a data transfer of the memory is synchronized, wherein said judging means judges said interleave control to be enabled when at least two access requests exist and are a write or read request to the memory, and wherein said first and second frequencies are different from each other.

4. A memory access control circuit for conducting an interleave control that, between an access request and a data transfer for the access request, another access request and data transfer are inserted while said memory access control circuit is disposed between a memory and a master device to issue an access request to the memory, comprising:

means for judging whether the access request can be interleaved or not;

means for selecting whether to conduct the interleave control or not according to the judgement result of said judging means;

means for dividing said access request into a plurality of access requests;

means for extracting data corresponding to said plurality of access requests directly from said master device or memory and transferring them to another party; and frequency-difference buffering means for allowing the writing to the memory to synchronize with a first clock frequency with which said master device is operated and allowing the reading from the memory to synchronize with a second clock frequency with which a data transfer of the memory is synchronized, wherein said judging means judges said interleave control to be enabled when at least two access requests exist and are a write or read request to the memory, and wherein said first and second frequencies are different from each other.

5. A memory access control circuit for conducting an interleave control that, between an access request and a data transfer for the access request, another access request and data transfer are inserted while said memory access control circuit is disposed between a memory and a master device to issue an access request to the memory, comprising:

means for judging whether the access request can be interleaved or not;

means for selecting whether to conduct the interleave control or not according to the judgement result of said judging means;

means for dividing said access request into a plurality of access requests;

means for extracting data corresponding to said plurality of access requests directly from said master device or memory and transferring them to another party;

request preference means for issuing a read request to the memory prior to a write request to the memory; and frequency-difference buffering means for allowing the writing to the memory to synchronize with a first clock frequency with which said master device is operated and allowing the reading from the memory to synchronize with a second clock frequency with which a data transfer of the memory is synchronized, wherein said judging means judges said interleave control to be enabled when at least two access requests exist and are a write or read request to the memory, and wherein said first and second frequencies are different from each other.

6. A memory access control circuit for conducting an interleave control that, between an access request and a data transfer for the access request, another access request and data transfer are inserted while said memory access control circuit is disposed between a memory and a master device to issue an access request to the memory, comprising:

means for judging whether the access request can be interleaved or not;

means for selecting whether to conduct the interleave control or not according to the judgement result of said judging means;

means for dividing said access request into a plurality of access requests;

means for extracting data corresponding to said plurality of access requests directly from said master device or memory and transferring them to another party;

pre-read means for issuing an access request for reading a following program prior to the access request from said master device when said access request is for reading a program stored in the memory; and frequency-difference buffering means for allowing the writing to the memory to synchronize with a first clock frequency with which said master device is operated and allowing the reading from the memory to synchronize with a second clock frequency with which a data transfer of the memory is synchronized, wherein said judging means judges said interleave control to be enabled when at least two access requests exist and are a write or read request to the memory, and wherein said first and second frequencies are different from each other.

7. A memory access control circuit for conducting an interleave control that, between an access request and a data transfer for the access request, another access request and data transfer are inserted while said memory access control circuit is disposed between a memory and a master device to issue an access request to the memory, comprising:

means for judging whether the access request can be interleaved or not;

means for selecting whether to conduct the interleave control or not according to the judgement result of said judging means;

means for dividing said access request into a plurality of access requests while extracting data corresponding to said plurality of access requests;

frequency-difference buffering means for allowing the writing to the memory to synchronize with a first clock frequency with which said master device is operated and allowing the reading from the memory to synchronize with a second clock frequency with which a data transfer of the memory is synchronized;

means for generating an interrupt to refresh the memory; and a timer for providing interrupt timing with a constant time period for said interrupt generating means, wherein said judging means judges said interleave control to be enabled when at least two access requests exist and are a write or read request to the memory, wherein said first and second frequencies are different from each other, and wherein said timer is driven by a clock or synchronizing the data transfer of the memory or a clock frequency-divided from that clock.

8. A memory access control circuit for conducting an interleave control that, between an access request and a data transfer for the access request, another access request and data transfer are inserted while said memory access control circuit is disposed between a memory and a master device to issue an access request to the memory, comprising:

means for judging whether the access request can be interleaved or not;

means for selecting whether to conduct the interleave control or not according to the judgement result of said judging means;

means for generating an interrupt to refresh the memory; and a timer for providing interrupt timing with a constant time period for said interrupt generating means, wherein said judging means judges said interleave control to be enabled when at least two access requests exist and are a write or read request to the memory, and wherein said timer is driven by a clock for synchronizing the data transfer of the memory or a clock frequency-divided from that clock.

* * * * *